US011734754B1

(12) United States Patent
Chavez et al.

(10) Patent No.: US 11,734,754 B1
(45) Date of Patent: Aug. 22, 2023

(54) INTELLIGENT LOAN RECOMMENDATION AGENT

(71) Applicant: UIPCO, LLC, San Antonio, TX (US)

(72) Inventors: Carlos JP Chavez, San Antonio, TX (US); Ryan Thomas Russell, San Antonio, TX (US); Ashley Raine Philbrick, San Antonio, TX (US); Quian Antony Jones, San Antonio, TX (US); Stacy Callaway Huggar, San Antonio, TX (US); Janelle Denice Dziuk, Falls City, TX (US); Yevgeniy Viatcheslavovich Khmelev, San Antonio, TX (US); Ravi Durairaj, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 448 days.

(21) Appl. No.: 16/737,036

(22) Filed: Jan. 8, 2020

Related U.S. Application Data

(60) Provisional application No. 62/798,548, filed on Jan. 30, 2019.

(51) Int. Cl.
*G06Q 40/03* (2023.01)
*G06Q 30/018* (2023.01)
(Continued)

(52) U.S. Cl.
CPC .......... *G06Q 40/03* (2023.01); *G06F 16/9536* (2019.01); *G06F 18/21* (2023.01); *G06N 5/04* (2013.01); *G06N 20/00* (2019.01); *G06Q 30/0185* (2013.01); *G06V 20/40* (2022.01); *G06V 40/20* (2022.01); *G10L 15/22* (2013.01); *G10L 25/30* (2013.01); *G10L 25/63* (2013.01)

(58) Field of Classification Search
CPC ....... G06Q 40/025; G06V 40/20; G10L 25/63; G10L 25/30
See application file for complete search history.

(56) References Cited

U.S. PATENT DOCUMENTS 10,121,207 B1* 11/2018 Devereaux et al. G06Q 30/0215
10,586,280 B2* 3/2020 McKenna et al. ..... G06N 20/20
(Continued)

FOREIGN PATENT DOCUMENTS

CN 107919137 A * 4/2018 ............... G06Q 40/025
WO 2006126183 A2* 11/2006 ............. G06Q 20/4016

OTHER PUBLICATIONS

Daniels, "Lie-detecting computer kiosks equipped with artificial intelligence look like the future of border security", May 2018. Available at: https://www.cnbc.com/2018/05/15/lie-detectors-with-artificial-intelligence-are-future-of-border-security.html (Year: 2018).*

(Continued)

*Primary Examiner* — David P Sharvin
*Assistant Examiner* — Gregory Harper
(74) *Attorney, Agent, or Firm* — Plumsea Law Group, LLC (57) ABSTRACT

An artificially intelligent loan recommendation agent and a method of making loan recommendations are disclosed. The artificially intelligent loan recommendation agent can classify applicants into traditional and non-traditional categories. Based on this categorization, the agent may use different information to make loan recommendations for the applicant. For non-traditional applicants, applicant rating information can be used, including ratings of an applicant's professional skills obtained from consumer review sites. The agent can also conduct virtual interviews and analyze body language and speech to determine if an applicant may be lying.

18 Claims, 8 Drawing Sheets

(51) Int. Cl.
*G06N 20/00* (2019.01)
*G06N 5/04* (2023.01)
*G06F 16/9536* (2019.01)
*G10L 25/63* (2013.01)
*G10L 25/30* (2013.01)
*G10L 15/22* (2006.01)
*G06V 20/40* (2022.01)
*G06V 40/20* (2022.01)
*G06F 18/21* (2023.01)

(56) References Cited

U.S. PATENT DOCUMENTS

| | | | |
|---|---|---|---|
| 10,614,525 B1* | 4/2020 | Devereaux et al. | G06Q 40/08 |
| 10,832,261 B1* | 11/2020 | Chan et al. | G06Q 40/025 |
| 11,080,304 B2* | 8/2021 | Jain et al. | G10L 15/26 |
| 2003/0032870 A1* | 2/2003 | Farwell | A61B 5/164 600/300 |
| 2004/0093218 A1* | 5/2004 | Bezar | G10L 17/26 704/E17.002 |
| 2010/0271615 A1* | 10/2010 | Sebastian et al. | G01S 17/34 356/28 |
| 2012/0262296 A1* | 10/2012 | Bezar | G10L 15/02 704/200 |
| 2012/0324353 A1* | 12/2012 | Torbey et al. | G06F 3/0482 715/716 |
| 2013/0138835 A1* | 5/2013 | Tegreene et al. | H04N 21/4788 709/246 |
| 2014/0329214 A1* | 11/2014 | Bitoun | G16H 20/70 434/262 |
| 2015/0142446 A1* | 5/2015 | Gopinathan et al. | G10L 25/48 705/38 |
| 2016/0034851 A1* | 2/2016 | Xiao et al. | G06Q 10/1053 348/14.02 |
| 2016/0189150 A1* | 6/2016 | Ahuja | G06Q 20/40145 705/44 |
| 2017/0004356 A1* | 1/2017 | Gil et al. | G06V 40/176 |
| 2017/0011243 A1* | 1/2017 | Hammer | G06K 7/10831 |
| 2017/0337628 A1* | 11/2017 | Arnall | G06Q 50/16 |
| 2018/0115899 A1* | 4/2018 | Kedem et al. | G06F 21/32 |
| 2018/0144746 A1* | 5/2018 | Mishra et al. | G06V 40/172 |
| 2018/0357286 A1* | 12/2018 | Wang et al. | G06F 16/9535 |
| 2019/0019249 A1* | 1/2019 | Bhattacharjee et al. | G06Q 40/025 |
| 2019/0038200 A1* | 2/2019 | Lee et al. | A61B 5/026 |
| 2019/0043127 A1* | 2/2019 | Mahapatra et al. | G06N 3/0445 |
| 2019/0220863 A1* | 7/2019 | Novick et al. | G06Q 20/10 |
| 2019/0279298 A1* | 9/2019 | Wang | G06Q 40/025 |
| 2019/0361917 A1* | 11/2019 | Tran et al. | G06Q 20/308 |
| 2020/0349938 A1* | 11/2020 | Hwang et al. | G06F 40/30 |
| 2021/0279668 A1* | 9/2021 | Mikhajlov | G06F 21/32 |

OTHER PUBLICATIONS

Poudel, "Internet Of Things: Underlying Technologies,Interoperability, And Threats To Privacy And Security", 2016. Available at: https://btlj.org/data/articles2016/vol. 31/31_ar/0997_1022_Poudel_WEB.pdf (Year: 2016).*

* cited by examiner

INTELLIGENT LOAN RECOMMENDATION AGENT

CROSS-REFERENCE TO RELATED APPLICATIONS

This application claims the benefit of Provisional Pat. Application Number 62/798,548 filed Jan. 30, 2019, and titled "Intelligent Loan Recommendation Agent," which is incorporated by reference herein in its entirety.

TECHNICAL FIELD

The present disclosure generally relates an artificial intelligence, and in particular to using artificial intelligence for loan recommending whether to approve or deny loans.

BACKGROUND

As more people transition from traditional types of employment and businesses to the so called "gig" economy, lending institutions may find that their loan approval processes are not well matched to the increasing pool of non-traditional applicants. Many potentially worthy applicants may not be able to provide the requisite borrowing histories, minimum salary thresholds, or credit scores that have historically been required. Additionally, conventional methods for detecting fraud in new loan applications may be insufficient.

There is a need in the art for a system and method that addresses the shortcomings discussed above.

SUMMARY

In one aspect, a method of improving loan approval recommendations using an artificially intelligent loan recommendation agent includes receiving a loan request from an applicant, retrieving a first set of information associated with the applicant, determining if the applicant has a traditional applicant status or a non-traditional applicant status based on the first set of information, retrieving a second set of information associated with the applicant when the applicant has the non-traditional status, and determining a loan recommendation status using the second set of information as an input when the applicant has the non-traditional status.

In another aspect, a method of improving loan approval recommendations using an artificially intelligent loan recommendation agent includes receiving a loan request from an applicant, retrieving financial information associated with the applicant, retrieving applicant rating information associated with the applicant, and determining if the loan request should be approved using the financial information and the applicant rating information.

In another aspect, a method of detecting fraud in a loan application process using an artificially intelligent loan recommendation agent includes conducting a virtual interview with the loan applicant, retrieving loan application information associated with the loan applicant, and receiving video information associated with the loan applicant, where the video information is captured during the virtual interview. The method also includes receiving audio information associated with the loan applicant, where the audio information is captured during the virtual interview. The method also includes using the video information to analyze the body language of the applicant, using the audio information to analyze the speech of the applicant, detecting fraud in the loan application process based on the analyzed body language or the analyzed speech, and denying a loan to the applicant when fraud is detected.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide systems and methods for improving loan approval recommendations and decisions using an artificially intelligent loan recommendation agent. The system and method include retrieving applicant rating information from one or more customer review sites. This applicant rating information, along with other kinds of information such as financial information and employment information, are used to determine if an applicant should be approved for a new loan. The artificially intelligent loan recommendation agent may use one or more machine learning algorithms to classify an applicant's loan recommendation status based on various input information. By using an artificially intelligent loan recommendation agent that considers applicant rating information, the exemplary method can better predict which loan applicants are least likely to default on loans even when there is little information about an applicant's borrowing and/or employment history. This allows lenders to expand lending opportunities to applicants who might not be qualified for loans based on traditional metrics only.

Additionally, the artificially intelligent loan recommendation agent may improve fraud detection by performing virtual interviews and analyzing the loan applicant's behavior. Specifically, by analyzing body language and/or speech using video information and audio information, respectively, the agent can detect signs that an applicant is lying or otherwise committing fraud. This further reduces the chances that a loan applicant who is approved will default.

Figure 1:
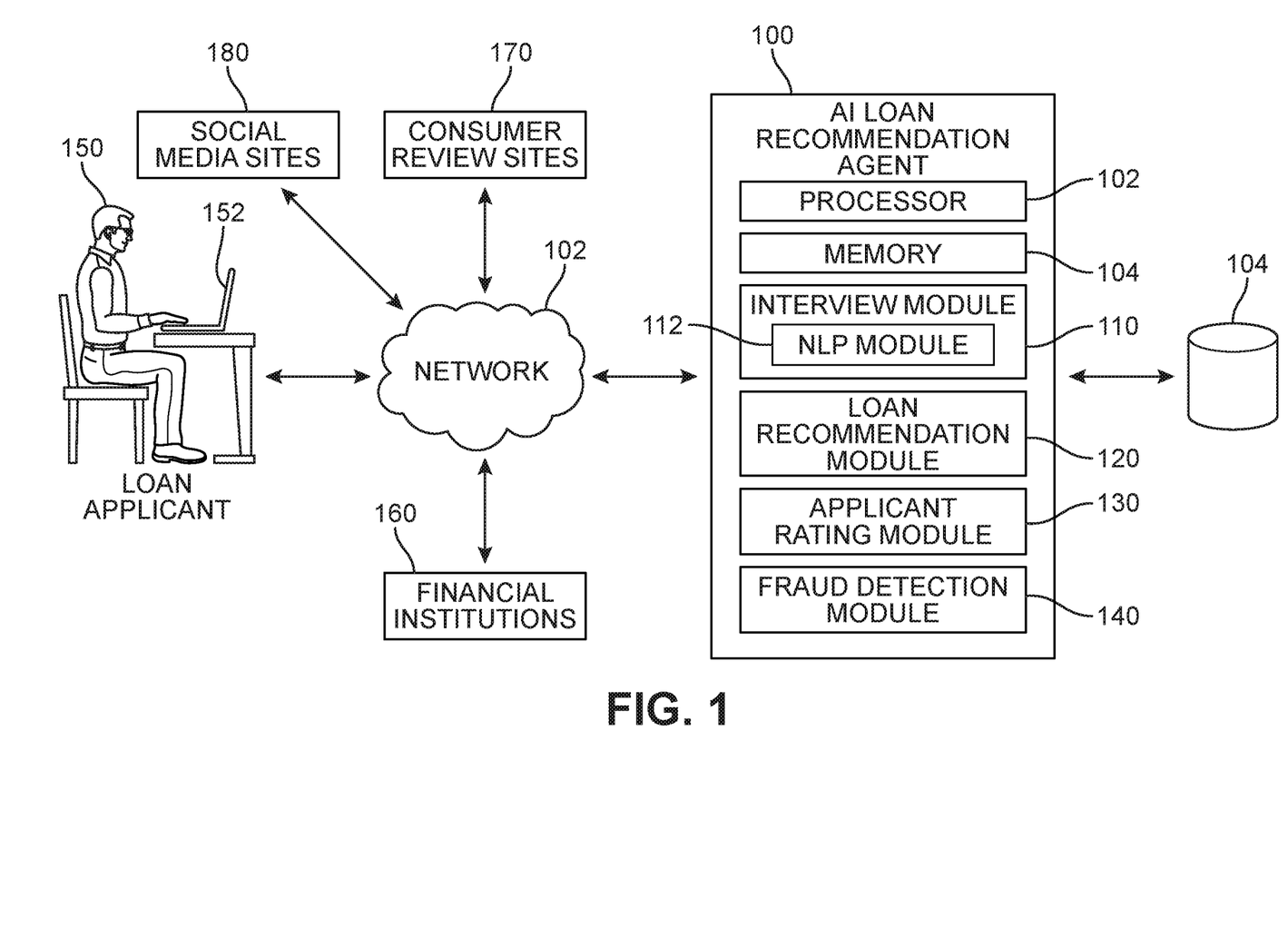
FIG. 1 is a schematic view of an artificially intelligent loan recommendation agent in communication with a loan applicant and other services, according to an embodiment.

FIG. 1 is a schematic view of an artificially intelligent loan recommendation agent 100 (or simply "agent 100"). Agent 100 may be configured to receive information about a loan request and communicate with a loan applicant 150. Agent 100 may further be configured to retrieve various information related to an applicant and use that information to make decisions about whether or not to recommend approval of a loan.

Agent 100 may be configured with at least one processor 102 and memory 104. Memory 104 may comprise a non-transitory computer readable medium. Instructions stored on the non-transitory computer readable medium may be executed by the one or more processors 102. Memory 104 may include any type of short-term and/or long-term memory (or storage), including Random Access Memory (RAM), micro-SD memory and Solid State Drives (SSD).

Agent 100 may also include provisions to facilitate communicating, and in some cases, interviewing, a loan applicant 150. As seen in FIG. 1, agent 100 includes an interview module 110. Interview module 110 may facilitate interactions with loan applicant 150, including generating questions and receiving responses. The responses can be processed by other modules. In some cases, interview module 110 can further comprise a natural language processing module 112 (or simply "NLP module 112"). Using NLP module 112, agent 100 may be capable of understanding written and/or spoken responses from loan applicant 150.

Agent 100 may further include loan recommendation module 120. Loan recommendation module 120 may comprise one or more processes for analyzing information and for recommending that a loan be approved or denied. In some embodiments where the loan approval process is entirely automated, the ultimate decision may be made by agent 100. In this case, the recommendation from loan recommendation module 120 may be taken as a loan approval decision.

As discussed in further detail below, agent 100 may consider review or rating information related to an applicant in making loan approval recommendations. To facilitate the retrieval and analysis of review or rating information, agent 100 may include an applicant rating module 130, which is discussed in further detail below and shown schematically in FIG. 3.

Agent 100 may include provisions to detect fraud. In some embodiments, agent 100 may incorporate a fraud detection module 140. Fraud detection module 140 may include processes that facilitate fraud detection in a loan application, including detecting fraud during a virtual interview with a loan applicant. Further details of the use of fraud detection module 140 are described below and shown in FIGS. 7-8.

In some embodiments, agent 100 may use one or more external databases 104 for information retrieval and/or storage. For example, agent 100 could retrieve potential interview questions from a set of historical interview dialogues stored on databases 104. Moreover, any of the systems and modules of agent 100 could store and retrieve data from databases 104. As another example, any data received by an agent for fraud detection purposes, including various forms of data indicated in FIG. 9 and described below, could be stored in, and/or retrieved from, databases 104.

Agent 100 may communicate with loan applicant 150 and/or other services or parties using a network 102. In some embodiments, network 102 may comprise the Internet. In other embodiments, network 102 could comprise a local area network, for example if the loan applicant fills out a loan application on site where agent 100 is housed.

Agent 100 may receive some forms of loan application information directly from loan applicant 150 over network 102. For example, loan applicant 150 may fill out a loan application online using a computing system 152 (such as a laptop) and submit the loan application to agent 100 for processing. In another example, agent 100 and loan applicant 150 may participate in a virtual interview, in which agent 100 asks loan applicant 150 questions and receives his or her responses in real time. In some embodiments, a loan application process requires a loan applicant to both fill out a loan application and to participate in a virtual interview with agent 100.

In addition to communicating with loan applicant 150, agent 100 may also be configured to communicate with, and/or retrieve information from, one or more additional service providers. In some cases, this communication could be accomplished using a web-based application programming interface (API). In other cases, agent 100 could retrieve data from an online site without using an API.

Agent 100 may be configured to retrieve information from one or more financial institutions 160. Specifically, agent 100 may request financial information associated with loan applicant 150. In some cases, agent 100 retrieves financial information in order to confirm or corroborate information already provided by loan applicant 150 in a loan application and/or interview. In other cases, agent 100 retrieves financial information that has not already been made available by loan applicant 150. As an example, agent 100 could retrieve a credit score for loan applicant 150 from one or more financial institutions 160. As another example, agent 100 could retrieve information related to previous loans made to loan applicant 150 by another bank or lender. This information could include the amount borrowed and whether or not the loan was successfully repaid.

Agent 100 may be configured to retrieve information from one or more consumer review sites 170. As used herein, a consumer review site is any website that provides listings of consumer reviews for products and/or services. Consumer review sites can include large retail websites that incorporate consumer reviews of products, as well as review sites that focus on reviews of services provided by small businesses and/or individuals. For example, review sites are known that provide consumer (or customer) reviews of services provided by plumbers, house cleaners, electricians, general contractors and other kinds of service professionals. Review sites are also known that provide consumer (or customer) reviews of restaurants, hotels and other service establishments.

Agent 100 may retrieve information from one or more social media sites 180. Social media sites can include any sites where users communicate over social networks. In some embodiments, social media sites can include a professional networking site where applicant's list employment experience and other professional information that may be relevant for securing a loan.

It may be appreciated that the embodiments are not intended to be limiting and in other embodiments agent 100 could be configured to communicate with, and/or retrieve information from, any other suitable companies, websites or other parties with information relevant to loan processing.

Figure 2:
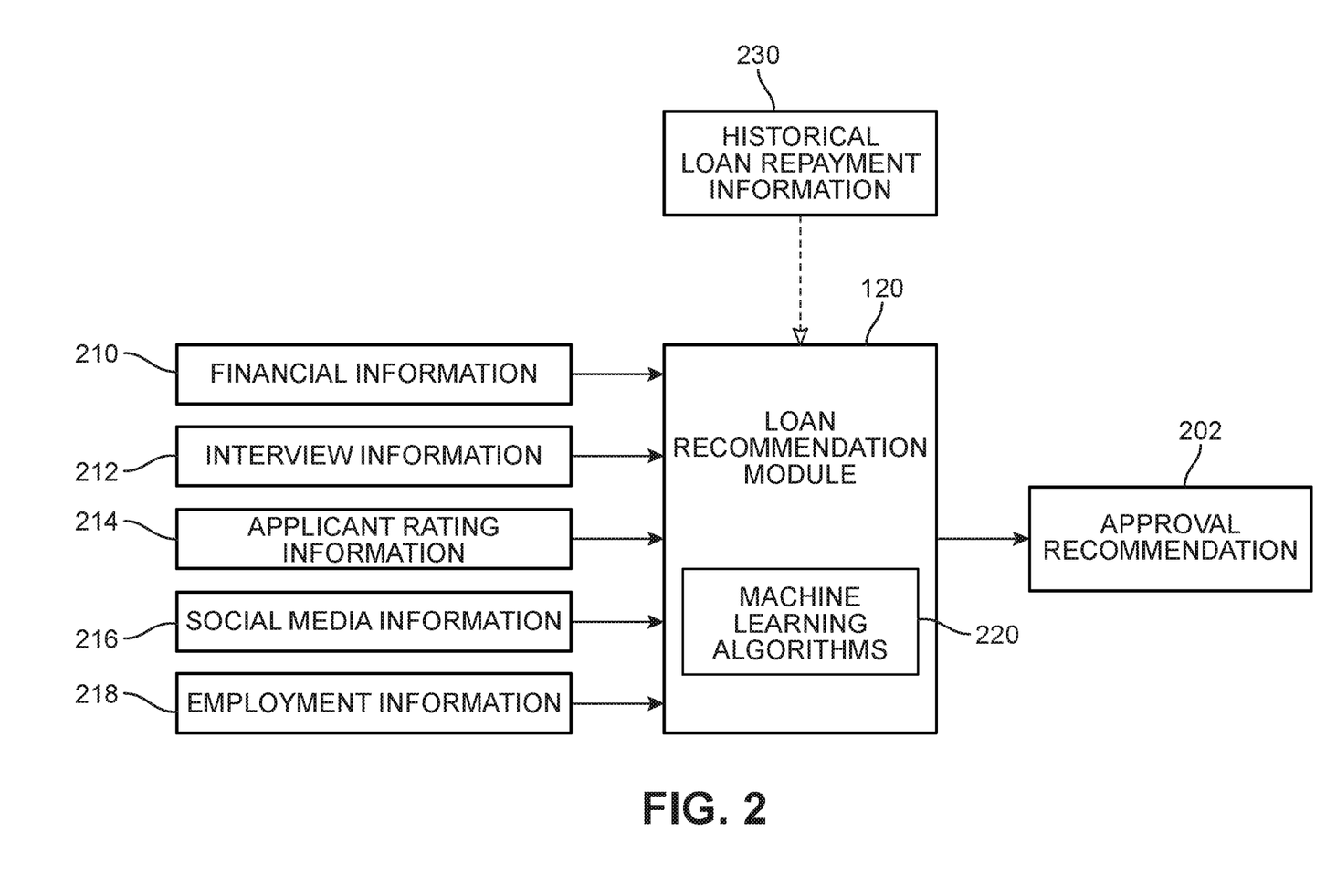
FIG. 2 is a schematic view of a loan recommendation module and associated inputs, according to an embodiment.

FIG. 2 is a schematic view of loan recommendation module 120. Loan recommendation module 120 may receive various kinds of input information and may output an approval recommendation 202. Referring to FIG. 2, the exemplary embodiment may include at least five different kinds of information that may be used by loan recommendation module 120 to make a loan recommendation. These include financial information 210, interview information 212, applicant rating information 214, social media information 216 and employment information 218.

These different forms of information can be provided by one or more parties described above and depicted in FIG. 1. For example, financial information 210 may be received directly from a loan applicant 150 and/or may be retrieved from financial institutions 160 (for example, banks, credit card companies, credit score monitoring companies and other kinds of financial institutions). Interview information 212 may be obtained through a virtual interview process as described above. Applicant rating information 214 may be retrieved from consumer review sites 170 and/or social medial sites 180. Social media information may be retrieved from social media sites 180. Additionally, employment information 218 could be retrieved directly from loan applicant 150 or could be received by an employer (for example, through email).

Examples of financial information that may be used by loan recommendation module 120 include, but are not limited to: credit scores, banking records, credit card records and borrowing history (that is, information related to any previous loans received by the applicant). Examples of employment information that may be used by loan recommendation module 120 include, but are not limited to: salary, type of employment, and duration of employment.

Interview information can comprise any information gathered from an applicant through an interview process. Interview information may include both verbal and non-verbal information. That is, interview information may comprise both the content of any responses provided by an applicant and the way that the content is delivered. Interview information can also include assessments of an applicant's behavior and character.

Social media information can comprise any information gathered from a social media site related to an applicant. Social media information can include text based information, photos and/or videos. In some embodiments, social media information can provide insight about various social networks that an applicant may participate in. Knowing that an applicant is a member of an entrepreneurial group, for example, could be useful for helping to decide if the applicant should receive a requested small business loan.

As used herein, the term "applicant rating information" refers to any information related to a review or rating of an applicant by a third party. In some cases, this information may generally be comprised of consumer reviews compiled on various consumer review sites.

Figure 3:
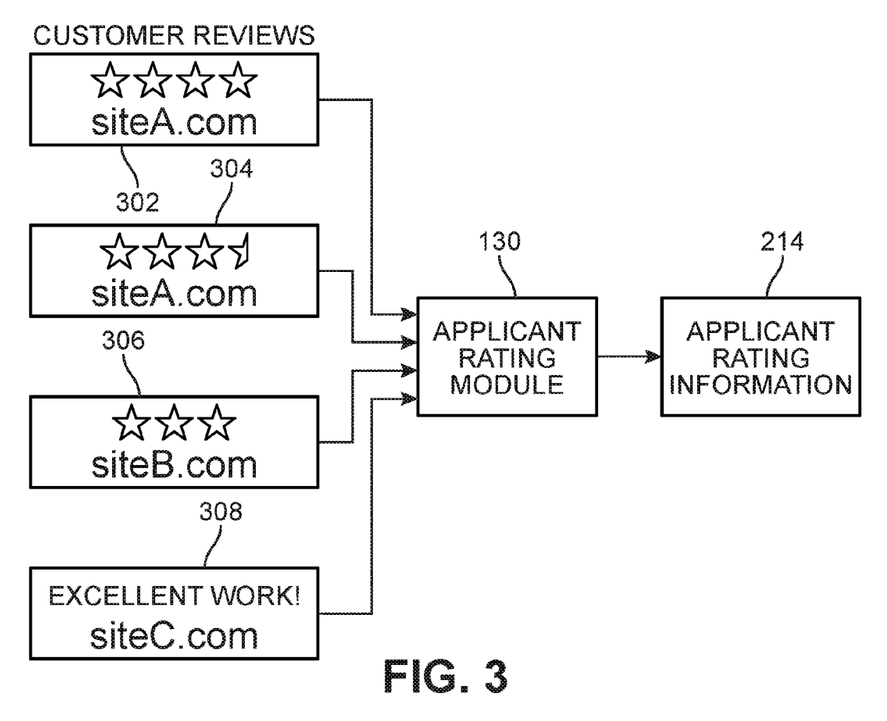
FIG. 3 is a schematic view of an applicant rating module for producing applicant rating information from input reviews or ratings, according to an embodiment.

As an example, FIG. 3 depicts four different reviews associated with an applicant. For example, the reviews could be related to professional work that the applicant has performed. In the exemplary embodiment, first review 302 comprises a four star rating of the applicant's work from a first website ("siteA.com"). Second review 304 comprises a three and a half star rating of the applicant's work from the same first website ("siteA.com"). Third review 306 comprises a three star review of the customer's work from a second website ("siteB.com"). By contrast, fourth review 308 comprises a written summary of the applicant's work ("Excellent work!"), rather than using a star based review system.

Each of these reviews are fed into applicant rating module 130. Applicant rating module 130 processes these reviews and may provide an output in the form of applicant rating information 214. In some embodiments, applicant rating information could comprise a single aggregated rating. In other embodiments, applicant rating information could comprise a list of two or more different ratings that can be fed into loan approval module 120.

It may be appreciated that applicant rating module 130 may perform multiple functions. In some embodiments, applicant rating module 130 may include processes for searching for, and retrieving, review and/or rating information for an applicant. In some cases, the applicant rating module 130 must first determine the applicant's name and the associated skill or set of skills for which rating information is required. For example, if an applicant is being approved for a small business loan to be used for a food truck, the applicant rating information should be ratings of the applicant's skills as a cook and/or entrepreneur. Reviews of non-relevant skills may be neglected by applicant rating module.

In addition, applicant rating module 130 may include processes for aggregating and/or normalizing reviews/ratings. For example, in the embodiment of FIG. 3, both quantitative (star based) and qualitative (word based) reviews are provided. Applicant rating module 130 may include processes for converting qualitative reviews into quantitative reviews so that the reviews are on a similar "scale". In some cases, applicant rating module 130 could utilize NLP module 112 to convert text into an associated quantitative rating. For example, "Good work" could be converted to a three star rating, while "Excellent work" could be converted to a five star rating. Moreover, applicant rating module 130 could also include processes for normalizing quantitative scores to a common scale, when two or more reviews are perceived to be relative to different scales (for example, a four star system vs. a five star system).

While the exemplary embodiments provide two examples of possible review/rating types, other embodiments could incorporate reviews or ratings of any other suitable types. These could include reviews with dozens or hundreds of words that could be analyzed and converted to a single quantitative number or a representative word.

Although the embodiment of FIG. 3 depicts the use of 4 ratings as input to applicant rating module 130, other embodiments could process any number of ratings. In some cases, for example, applicant rating module 130 could be configured to retrieve and process dozens or even hundreds of reviews/ratings.

In some embodiments, an agent could also attempt to detect reviews that could be fraudulent, so that those reviews are not used in evaluating applicant's loan worthiness. For example, an agent could incorporate known review analysis algorithms that may detect if a review is generated by a bot, is spam, and/or is a paid review. Therefore, in some embodiments, an applicant rating module may also evaluate whether a particular review is valid or invalid, for the purposes of evaluating loan worthiness.

Referring back to FIG. 2, loan recommendation module 120 may analyze the input information and determine an approval recommendation 202. In some cases, loan recommendation module 120 may further include one or more types of machine learning algorithms 220 to determine loan approval recommendations. Exemplary machine learning algorithms that could be used include supervised learning algorithms, unsupervised learning algorithms and reinforcement learning algorithms. More specific machine learning algorithms that may be used include regression algorithms, neural network algorithms, support vector machines, decision trees, Q-learning algorithms and clustering algorithms.

Depending on the type of machine learning algorithm used to generate a loan recommendation, the output of loan recommendation module 120 could vary. In some embodiments, the output is classified into two categories corresponding to "recommend loan approval" and "recommend loan rejection". However, in other embodiments, the output could be classified into three or more categories, corresponding to degrees of recommendation. For example, the outputs could correspond to four categories labeled as: "strongly recommend loan rejection," "recommend loan rejection," "recommend loan approval," and "strongly recommend loan approval." If the approval agent returns either of the "strongly" recommended categories, processes further downstream may consider this to be a final decision. However, if the approval agent returns either category that isn't "strongly" recommended, then this may indicate that further review (perhaps by a human counterpart) is needed to approve or reject the loan request. In still other embodiments, an approval agent could output a continuous number between 0 and 1. Such a number could represent the probability that certainty with which the loan is recommended. In other cases, such a number could represent the probability that the applicant may default on the loan.

FIG. 2 also depicts an optional input to loan recommendation module 120. Specifically, historical loan repayment information 230 could be used as an input to train machine learning algorithms 220 prior to deployment of agent 100. Historical loan repayment information 230, when paired with other kinds of historical information (such as historical financial information, historical interview information, historical applicant rating information, historical social media information and historical employment information) may facilitate the training of supervised machine learning algorithms. In particular, the historical loan repayment information 230 provides known target outputs for approval recommendation 202 for training purposes.

Figure 4:
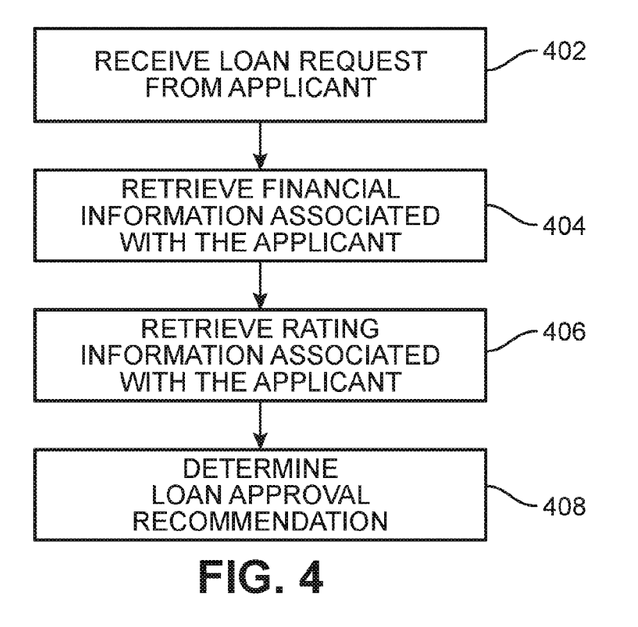
FIG. 4 is a schematic view of a process for determining a loan approval recommendation, according to an embodiment.

FIG. 4 is a schematic view of a process for determining if a loan should be approved using an artificially intelligent loan recommendation agent. In the exemplary embodiment, some or all of these steps may be performed by agent 100 (see FIG. 1). In other embodiments, one or more steps could be performed by another system or party.

In a first step 402, agent 100 receives a loan request from an applicant (for example, loan applicant 150). Next, in step 404, agent 100 retrieves financial information associated with the applicant. Financial information could be retrieved directly from the applicant and/or from one or more financial institutions. This information could include credit scores, account balances as well as other kinds of financial information. Optionally, in some embodiments, employment information could also be retrieved. Moreover, some or all of this information could be retrieved during a virtual interview conducted with the applicant.

Next, in step 406, agent 100 may retrieve rating information associated with the applicant. More specifically, an applicant rating module (such as applicant rating module 130) may search for, and retrieve, one or more reviews/ratings of the applicant and incorporate these into the applicant rating information.

Finally, in step 408, agent 100 analyzes all of this information, including the applicant rating information, to determine a loan approval recommendation.

In some embodiments, an artificially intelligent loan recommendation agent may utilize different kinds of information based on the type of loan applicant. For example, loan applicants could be divided into two different groups: traditional applicants and non-traditional applicants. Traditional applicants may be those applicants that can be approved or denied loans primarily on the basis of financial information and/or employment information. These applicants may have traditional forms of employment, a history of using credit and/or a history of borrowing (for example, the applicants may be homeowners with a mortgage). By contrast, non-traditional applicants may not have traditional forms of employment and/or sufficient records of credit or borrowing. In order to best evaluate the non-traditional applicants, therefore, the loan recommendation agent may utilize information above and beyond financial records and employment information. These may include, but are not limited to: applicant rating information, social media information and/or interview information.

Figure 5:
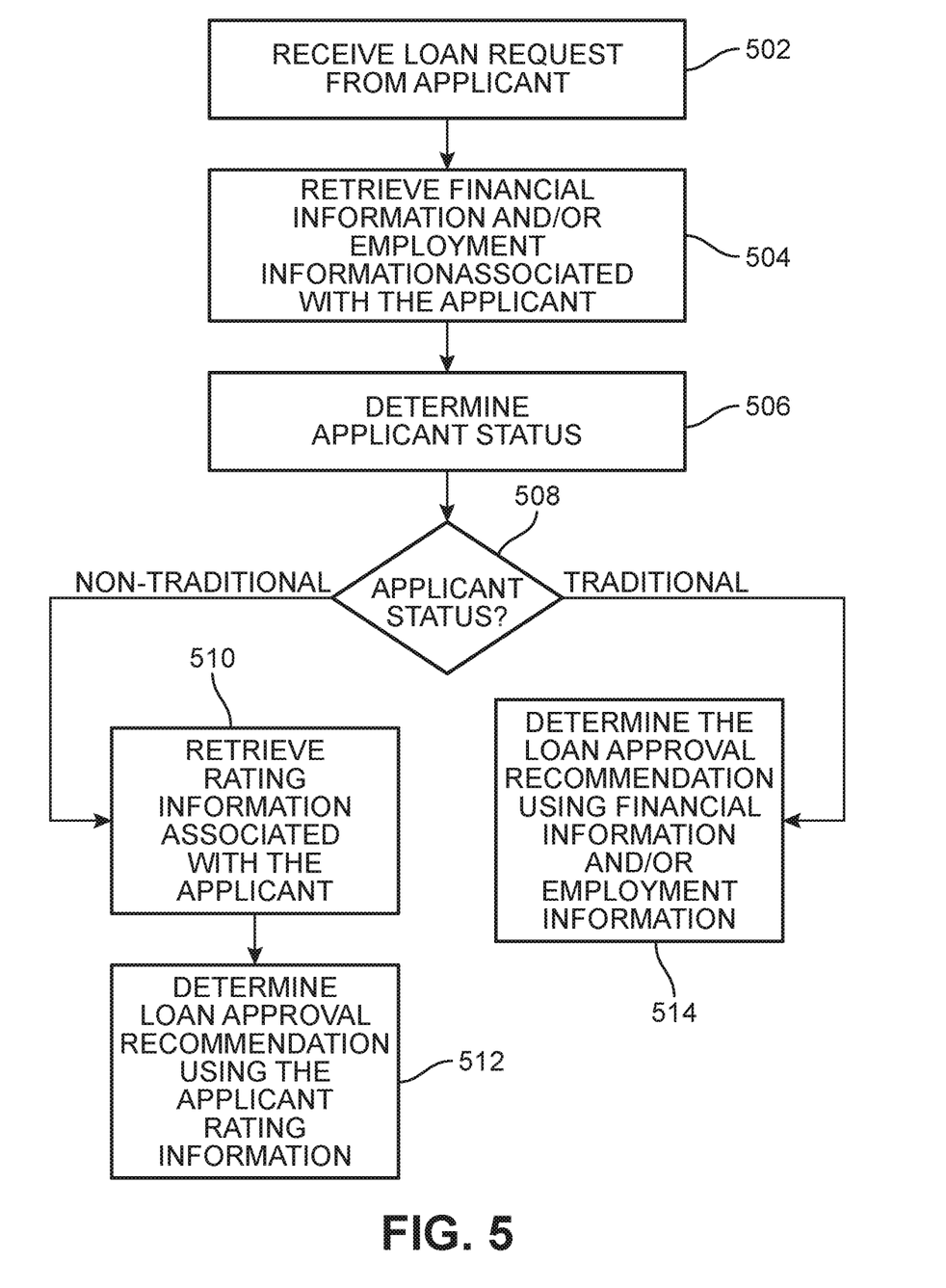
FIG. 5 is a schematic view of a process for determining a loan approval recommendation based on an applicant status, according to an embodiment.

FIG. 5 depicts another schematic view of a process for determining if a loan should be approved using an artificially intelligent loan recommendation agent. In this exemplary process, step 502 may proceed as in step 402. At step 504, agent 100 may retrieve financial and/or employment information associated with the applicant. However, once financial information associated with the applicant is retrieved in step 504, agent 100 may then determine the applicant status in step 506. In some cases, in addition to using financial information, agent 100 could also use employment information to determine the applicant's status.

Different embodiments could use different methods for sorting applicants into traditional and non-traditional groups. As one example, an agent could analyze an applicant's financial information and determine if they have a sufficient credit and/or borrowing history to use as a basis for a loan approval decision. As another example, an agent could analyze an employee's employment history and determine if they have a sufficient employment history to use as the basis for a loan approval decision.

Based on the applicant status determined in step 506, agent 100 decides how to proceed in step 508. If the applicant status is traditional, agent 100 may proceed to step 514. In step 514, agent 100 may determine the loan approval recommendation using financial information and/or employment information.

If the applicant status is non-traditional, agent 100 may proceed from step 508 to step 510. In step 510, agent 100 may retrieve rating information associated with the applicant. In some cases, applicant rating information may be retrieved from an applicant rating module.

Next, in step 512, agent 100 may determine the loan approval recommendation using applicating rating information. In some cases, agent may also use additional information in step 512. That is, agent 100 may use financial information, employment information and applicant rating information, as well as any other kinds of information described above.

Figure 6:
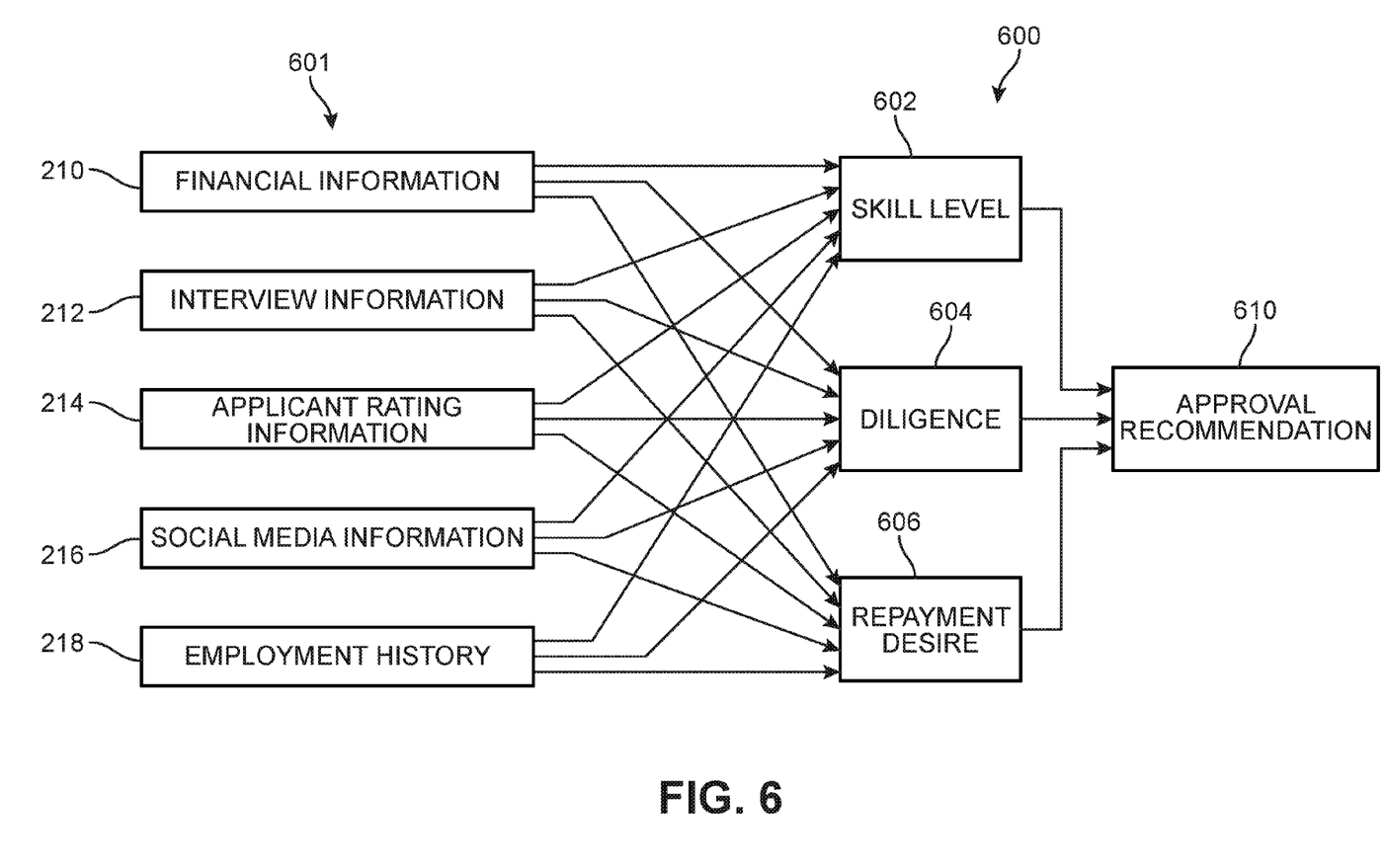
FIG. 6 is a schematic view of a set of loan approval features as well as inputs for determining the loan approval features, according to an embodiment.

FIG. 6 is a schematic view of a set of loan approval features 600 that may be used to make a loan approval recommendation. Loan approval features 600 may comprise different desirable characteristics that an applicant should have to be approved for a loan. In the embodiment of FIG. 6, loan approval features 600 include skill level 602, diligence 604 and repayment desire 606. Skill level 602 may be a measure of the applicant's skills or abilities as they pertain to the intended use of the loan. For example, if an applicant intends to open a food truck with a small business loan, skill level 602 may be a measure of the applicant's culinary abilities, service abilities and/or general business management abilities. Diligence 604 may be a measure of the applicant's ability to work hard and see a project or task through to completion. Diligence 604 may be a generic characteristic that is independent of the applicant's particular skill level. For example, an applicant may not be highly proficient at a skill related to their loan, but they may nonetheless have a great deal of perseverance. Repayment desire 606 may be a measure of the applicant's inherent desire to repay loans. For example, a small business owner who takes out a loan may fail in their business endeavor, but still feel obligated to pay back the loan without defaulting. As long as this person is a hard worker (for example, they have a high measure of diligence 604), they may be expected to pay back the loan over time through other employment opportunities.

Each of these loan approval features 600 may be determined as a function of the input information 601 available to an AI loan recommendation agent. In the exemplary embodiment of FIG. 6, an agent (for example, agent 100) determines skill level 602, diligence 604 and repayment desire 606 based on inputs from each of the five kinds of input information already described. These include financial information 210, interview information 212, applicant rating information 214, social media information 216 and employment information 218.

In some embodiments, loan approval features 600 may be determined as features in a machine learning algorithm. For example, a neural network algorithm could be implemented in which input information 601 is provided as a first layer of the network, loan approval features 600 are provided as a hidden layer of the network, and the approval recommendation 610 is provided as an output layer (or single node). In another embodiment, loan approval features 600 could be associated features of other kinds of machine learning models, including, but not limited to: various kinds of regression models and support vector machine models. When machine learning models are used, loan approval features 600 may be learned automatically by the models. In still other embodiments, loan approval features 600 could be determined according to manually implemented functions of input information 601.

Figure 7:
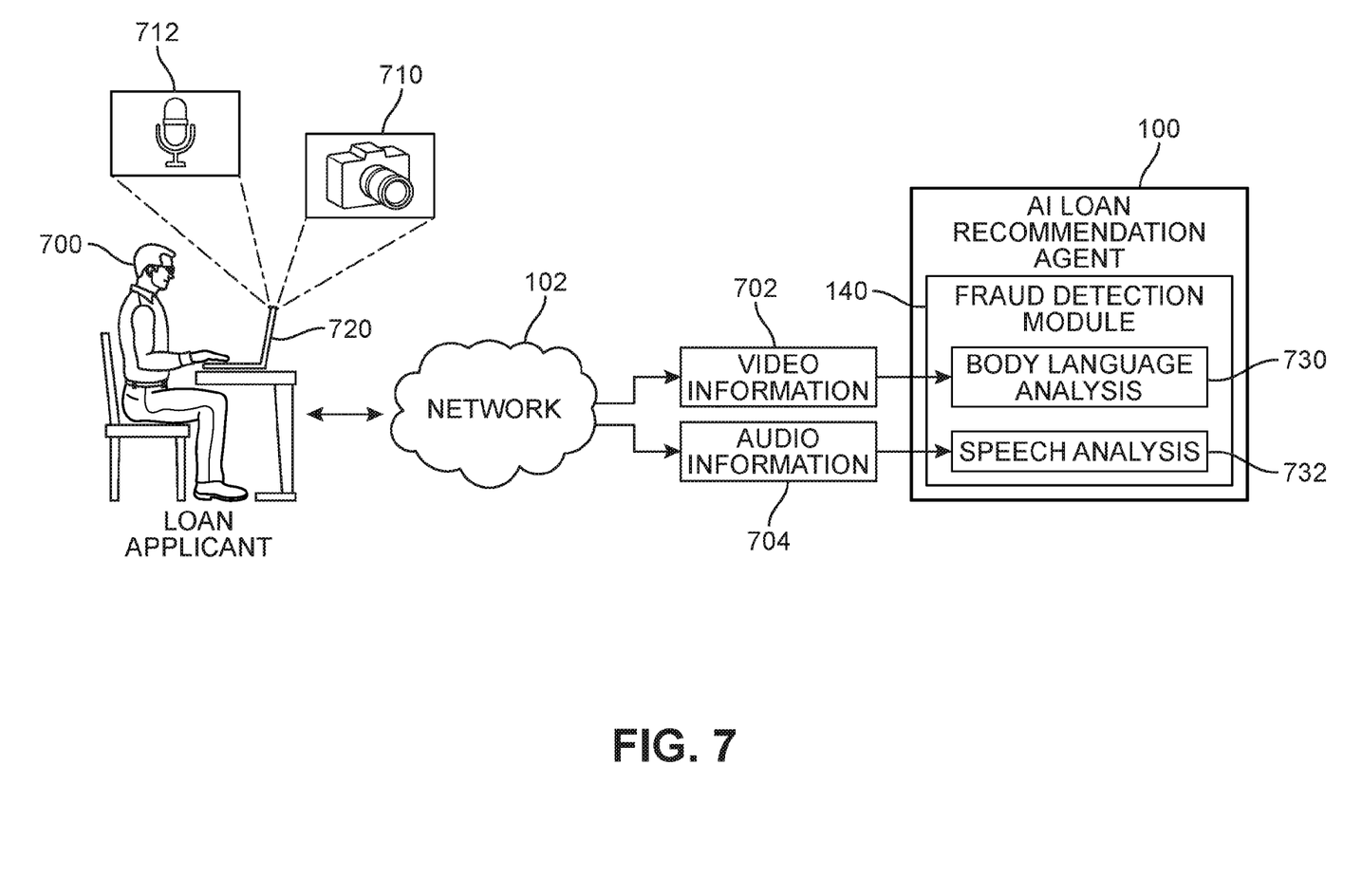
FIG. 7 is a schematic view of an artificially intelligent loan recommendation agent performing a virtual interview with a loan applicant.

FIG. 7 is a schematic view of a configuration for artificially intelligent loan recommendation system 100 that may facilitate fraud detection in a loan application process. As seen in FIG. 7, agent 100 may receive video information 702 and audio information 704 associated with a loan applicant 700 during a virtual interview. Specifically, video information 702 may be received from a camera 710 of computing system 720 while audio information 704 may be received from a microphone 712 of computing system 720. This information may then be fed into associated processes of fraud detection module 140. Specifically, video information 702 may be fed into a body language analysis system 730 and audio information 704 may be fed into a speech analysis system 732.

Figure 8:
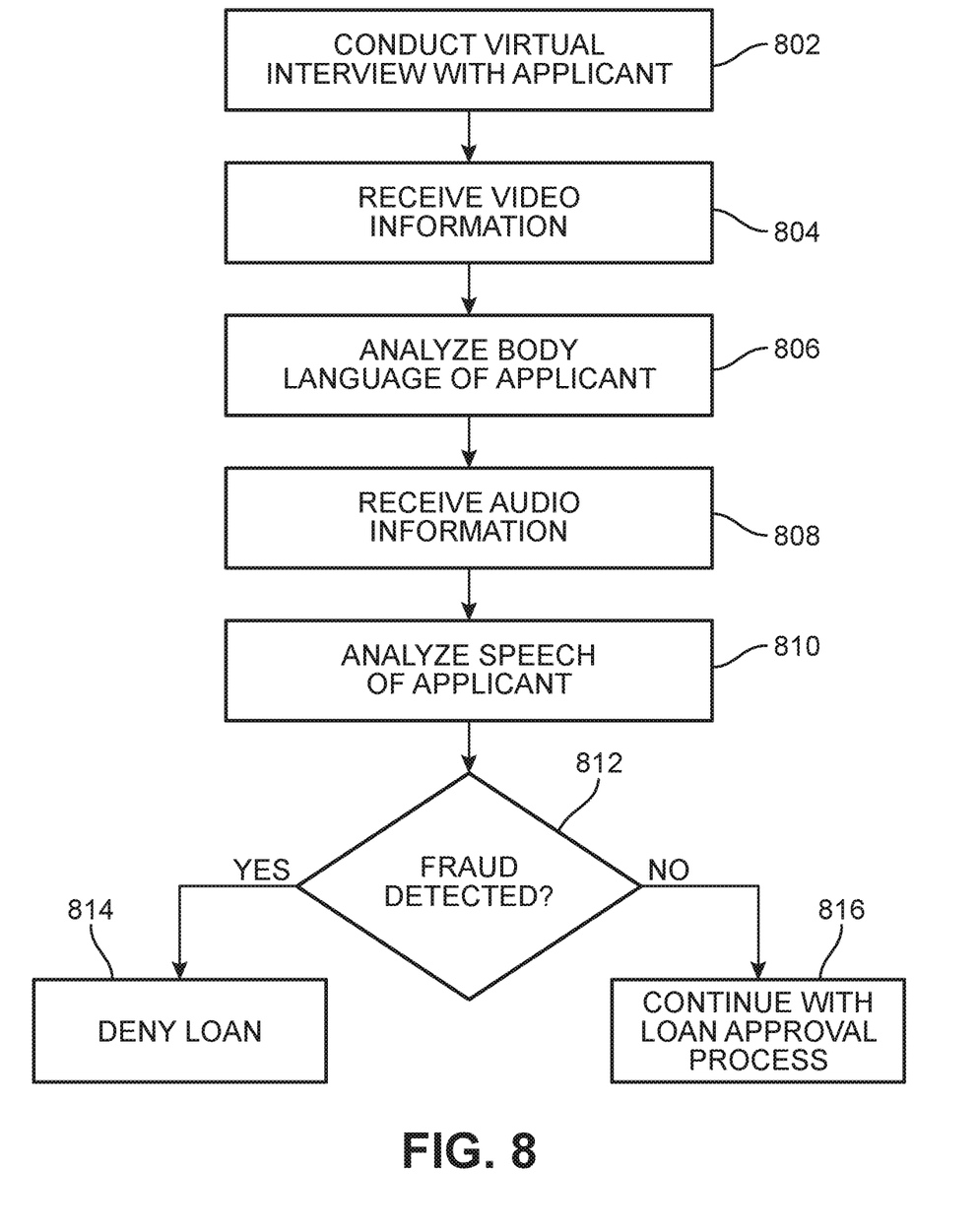
FIG. 8 is a schematic view of a process for detecting fraud in a loan application process, according to an embodiment.

FIG. 8 is a schematic view of a process for detecting fraud using the system depicted in FIG. 7. In step 802, agent 100 may conduct a virtual interview with an applicant (for example, applicant 700). Next, in step 804, agent 100 may receive video information. In step 806, agent 100 may analyze the body language of the applicant using the received video information. In step 808, agent 100 may receive audio information. In step 810, agent 100 may analyze the speech of the applicant using the received audio information.

Based on analyzing the body language and/or speech of the applicant, agent 100 may determine if any fraud has been detected in step 812. If so, agent 100 may deny the loan in step 814. Otherwise, agent 100 may proceed with the loan approval process at step 816.

Fraud may be detected using a variety of different methods. In some embodiments, machine learning algorithms can be used to detect irregular patterns in the body language or speech of an applicant, which may be suggestive that an applicant is lying. Alternatively, speech analysis and/or body language analysis could be used to verify the identity of a loan applicant, when authenticated speech and/or body language samples exist.

Body language analysis and/or speech analysis could be performed using various kinds of machine learning algorithms. In some embodiments, deep neural networks could be used for analyzing video information and/or audio information. Methods for detecting patterns in video information and audio information are known and may comprise various different implementations of deep neural networks and/or other types of machine learning algorithms.

Figure 9:
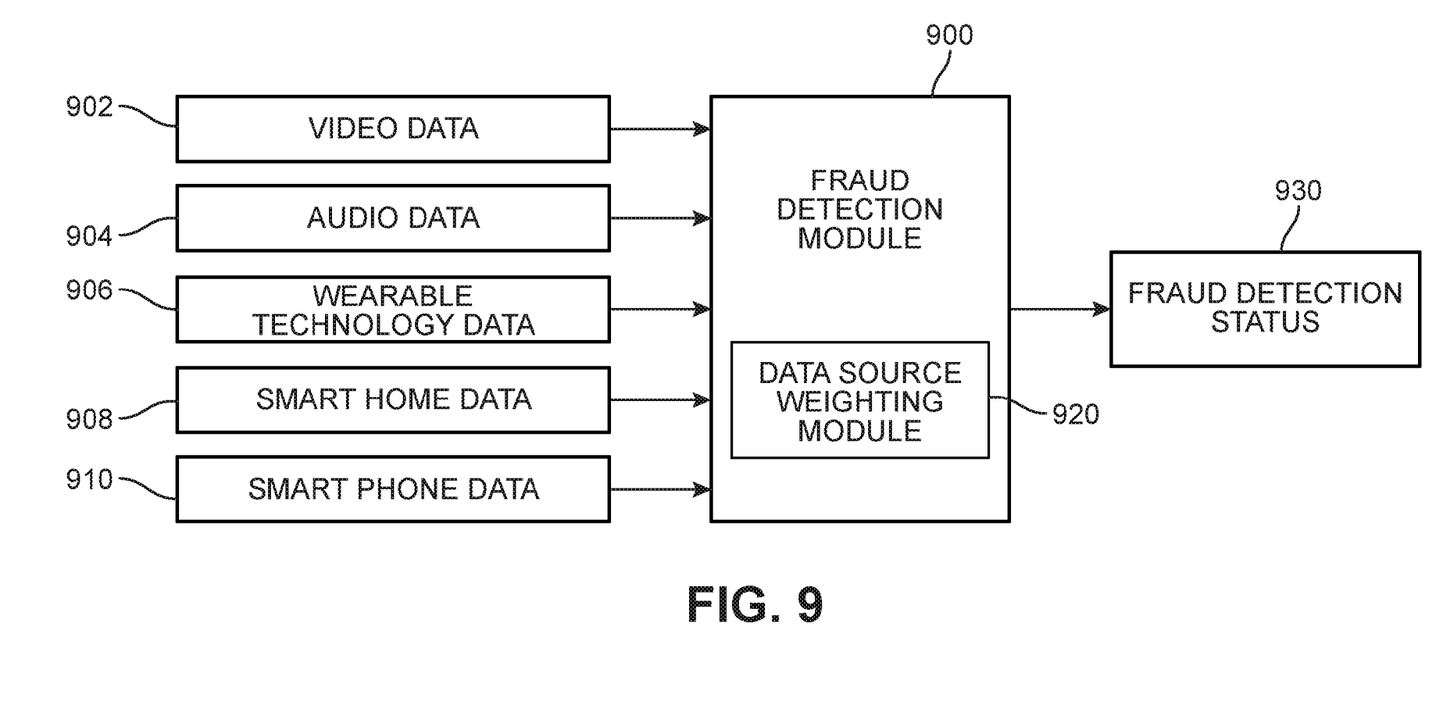
FIG. 9 is a schematic view of another configuration where a fraud detection module receives data from multiple data sources, according to an embodiment.

FIG. 9 depicts another embodiment in which a fraud detection module 900 receives data from multiple different data sources in order to determine a fraud detection status 930. These data sources include video data 902 and audio data 904, as described in earlier embodiments, as well as wearable technology data 906, smart home data 908 and smart phone data 910.

Wearable technology data 906 could include any data available from an applicant's smart watch. Exemplary types of data that can be gathered from smart watches include pulse data, pulse oximetry data, ECG data, blood glucose level data, perspiration data, 3D accelerometer data, and any other kinds of data available from smart watches or similar devices (for example, fitness trackers). Some of these data types may be used in detecting accelerated heart rates, increased perspiration and/or oxygen levels, which could serve as proxies for stress levels to indicate if an applicant is being deceptive. Also, accelerometer data from a smart watch can be used to detect various movements such as twitching, knee bouncing, or other motions that could feed into the body language analysis system 730 described above. In some cases, some of the data described above could be analyzed over a period of time to determine if the data can be used as an indicator for deception.

Other types of wearable technology include, but are not limited to: smart rings, smart glasses, and smart apparel. These other types of wearable technology may also detect and record biometric data as well as position data, motion/acceleration data, as well as other suitable kinds of data. It may be appreciated that data from any other kinds of wearable technology could be delivered to an artificially intelligent loan recommendation agent for use in fraud analysis.

Smart home data 908 can include data from home hubs, which includes various smart voice assistants. Data from home hubs could be used, for example, to determine if there is another person near the applicant who may be coaching and/or pressuring them.

Smart home data 908 can also include information from smart lighting components. For example, determining the flush on someone's skin could be made easier for an AI loan recommendation agent if any smart lighting data can be sent to an agent in combination with one or more camera feeds. Knowing, for instance, that the smart lights are set to a specific setting could greatly improve the accuracy of the fraud detection models. Alternatively, if the AI loan recommendation agent were enabled to set the applicant's smart lights to a given setting, this may facilitate increased control of the environment to improve repeatability of any associated fraud detection analyses.

Smart home data 908 can also thermostat data. Knowing the temperature in the applicant's environment, particularly if this data is paired with additional data from other associated smart components, would help improve any methods for detecting deception. For instance: If someone is applying for a loan, is perspiring heavily (visibly), and the room temperature is 60° F., then this is an indicator of potential deception.

Some embodiments could also use smart phone data 910. For example, a smart phone could provide the location of the applicant. If the location of the application as indicated by the smart phone data doesn't match where the applicant says they live, or are otherwise currently located, then this could be an indication that the applicant is being deceptive. Smart phone data could also include various kinds of movement data that could be fed into a body language analysis system. Also, it may be appreciated that in some embodiments, data from other smart devices could be sent first to a smart phone and then submitted to an AI loan recommendation agent over a network, such as the Internet.

Fraud detection module 900 may also include a data source weighting module 920. Data source weighting module 920 could be used to weight (or score) different data sources according to their known reliability in detecting fraud/deception. For instance, if multiple different data sources from different devices (for example, smart watches, cameras, smart thermostats) are used by a fraud detection module, each different data type and/or various combinations of data types could add a different number of points to an applicant's fraud score. Also, using multiple different data types could increase an overall score of confidence in the data itself due to multiple validation points. In some embodiments, these weightings (or scoring) could be accomplished using one or more machine-learning techniques.

While the exemplary embodiment depicts the use of an artificially intelligent loan recommendation agent for use by a lender, it may be appreciated that the agent could also be used as a source of information by other parties engaged in a potential loan transaction. For example, if one individual is considering loaning money or other assets to another individual, the exemplary agent described herein could be used as a third party source for evaluating the loan worthiness of the requesting party and/or whether the requesting party may be engaging in fraud or deception. Thus, in some embodiments, an agent may not only receive information from other sources, but could also push information to other sources, such as an individual requesting a loan application recommendation for a person requesting a loan. In other words, the artificially intelligent loan approval agent could be operated as a third party service to be used by individual lenders or small organizations.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of detecting fraud in a loan application process using an artificially intelligent loan recommendation agent, the method comprising:
   conducting a virtual interview with a loan applicant;
   retrieving loan application information associated with the loan applicant;
   receiving video information associated with the loan applicant, the video information being captured during the virtual interview using a camera;
   receiving audio information associated with the loan applicant, the audio information being captured during the virtual interview using a microphone;
   receiving biometric information and movement information associated with the loan applicant, the biometric information and movement information being captured during the virtual interview using a wearable device;
   receiving environmental information associated with the loan applicant, the environmental information being captured during the virtual interview using sensors of a smart home;
   receiving position information associated with the loan applicant, the position information being captured during the virtual interview using a smart phone;
   using the video information to analyze body language of the loan applicant using machine learning algorithms to detect irregular patterns in the body language of the loan applicant that suggest fraud;
   using the audio information to analyze speech of the loan applicant using machine learning algorithms to detect irregular patterns in the speech of the loan applicant that suggest fraud;
   detecting fraud in the loan application process based on the analyzed body language and the analyzed speech, and based on determining when at least one of the biometric information, the movement information, the environmental information and the position information indicates fraud, the fraud being associated with a confidence score based on an amount of information used to detect the fraud;
   wherein the biometric information and the environmental information indicate fraud when the wearable device detects increased perspiration of the loan applicant and the sensors of the smart home detect a cool temperature in the smart home;
   wherein the movement information indicates fraud when the wearable device detects at least one of twitching and knee bouncing; and
   pushing a recommendation to deny a loan to the loan applicant over a network to a loan provider when the fraud is detected with a confidence score that exceeds a threshold.

2. The method according to claim 1, wherein the environmental information further indicates fraud when the sensors of the smart home detect coaching of the loan applicant by another person in the smart home.

3. The method according to claim 1, wherein the position information indicates fraud when the smart phone detects a discrepancy between an actual location of the loan applicant and a claimed location of the loan applicant.

4. The method according to claim 1, wherein the using the video information to analyze the body language of the loan applicant comprises using a deep neural network to identify the irregular patterns in the video information.

5. The method according to claim 1, wherein the using the audio information to analyze the speech of the loan applicant comprises using a deep neural network to identify the irregular patterns in the audio information.

6. A method of detecting fraud in a loan application process using an artificially intelligent loan recommendation agent, the method comprising:
   conducting a virtual interview with a loan applicant;
   retrieving loan application information associated with the loan applicant;
   receiving video information associated with the loan applicant, the video information being captured during the virtual interview using a camera;
   receiving audio information associated with the loan applicant, the audio information being captured during the virtual interview using a microphone;
   receiving biometric information and movement information associated with the loan applicant, the biometric information and movement information being captured during the virtual interview using a wearable device;
   receiving environmental information associated with the loan applicant, the environmental information being captured during the virtual interview using sensors of a smart home;
   using the video information to analyze body language of the loan applicant using machine learning algorithms to detect irregular patterns in the body language of the loan applicant that suggest fraud;
   using the audio information to analyze speech of the loan applicant using machine learning algorithms to detect irregular patterns in the speech of the loan applicant that suggest fraud;
   detecting fraud in the loan application process based on the analyzed body language and the analyzed speech, and based on determining when at least one of the biometric information, the movement information, and the environmental information indicates fraud;
   wherein the biometric information and the environmental information indicate fraud when the wearable device detects increased perspiration of the loan applicant and the sensors of the smart home detect a cool temperature in the smart home;

wherein the movement information indicates fraud when the wearable device detects at least one of twitching and knee bouncing; and pushing a recommendation to deny a loan to the loan applicant over a network to a loan provider when the fraud is detected.

7. The method according to claim 6, wherein the detecting the fraud is associated with a confidence score based on an amount of information used to detect the fraud and the recommendation to deny the loan to the loan application is pushed over the network to the loan provider applicant when the fraud is detected with a confidence score that exceeds a threshold.

8. The method according to claim 7, wherein the confidence score is based on an amount of information used to detect the fraud.

9. The method according to claim 6, wherein the biometric information indicates fraud when the wearable device detects at least one of increased perspiration of the loan applicant and an increased oxygen level of the loan applicant.

10. The method according to claim 6, wherein the environmental information further indicates fraud when the sensors of the smart home detect coaching of the loan applicant by another person in the smart home.

11. The method according to claim 7, wherein the sensors of the smart home detect a lighting level of the smart home to thereby detect the fraud with a greater confidence score by considering the lighting level when detecting the fraud.

12. The method according to claim 6, further comprising receiving position information associated with the loan applicant, the position information being captured during the virtual interview using a smart phone, wherein the position information is used to detect the fraud.

13. The method according to claim 12, wherein the position information indicates fraud when the smart phone detects a discrepancy between an actual location of the loan applicant and a claimed location of the loan applicant.

14. A method of detecting fraud in a loan application process using an artificially intelligent loan recommendation agent, the method comprising:

conducting a virtual interview with a loan applicant;

retrieving loan application information associated with the loan applicant;

receiving video information associated with the loan applicant, the video information being captured during the virtual interview using a camera;

receiving audio information associated with the loan applicant, the audio information being captured during the virtual interview using a microphone;

receiving biometric information and movement information associated with the loan applicant, the biometric information and movement information being captured during the virtual interview using a wearable device;

receiving position information associated with the loan applicant, the position information being captured during the virtual interview using a smart phone;

using the video information to analyze body language of the loan applicant to detect indicators that suggest fraud;

using the audio information to analyze speech of the loan applicant to detect indicators that suggest fraud;

detecting fraud in the loan application process based on the analyzed body language and the analyzed speech and based on determining when at least one of the biometric information, the movement information, the environmental information and the position information indicates fraud, the fraud being associated with a confidence score based on an amount of information used to detect the fraud;

wherein the biometric information and the environmental information indicate fraud when the wearable device detects increased perspiration of the loan applicant and the sensors of the smart home detect a cool temperature in the smart home;

wherein the movement information indicates fraud when the wearable device detects at least one of twitching and knee bouncing; and denying a loan to the loan applicant when the fraud is detected with a confidence score that exceeds a threshold.

15. The method according to claim 14, wherein the environmental information further indicates fraud when the sensors of the smart home detect coaching of the loan applicant by another person in the smart home.

16. The method according to claim 14, wherein the position information indicates fraud when the smart phone detects a discrepancy between an actual location of the loan applicant and a claimed location of the loan applicant.

17. The method according to claim 14, wherein the detecting fraud uses machine learning algorithms including at least one of supervised learning algorithms, unsupervised learning algorithms, reinforcement learning algorithms, regression algorithms, neural network algorithms, support vector machines, decision trees, Q-learning algorithms, and clustering algorithms.

18. The method according to claim 17, wherein the machine learning algorithms detect at least one of the irregular patterns in the speech of the loan applicant and the irregular patterns in the body language of the loan applicant using at least one deep neural network.

* * * * *